(12) United States Patent
Vermeulen et al.

(10) Patent No.: US 12,448,041 B2
(45) Date of Patent: Oct. 21, 2025

(54) TANK STEER SYSTEM FOR VEHICLE

(71) Applicant: FCA US LLC, Auburn Hills, MI (US)

(72) Inventors: Chad J Vermeulen, Windsor (CA); Pradeep R Attibele, Ann Arbor, MI (US); Mark A Levine, White Lake, MI (US)

(73) Assignee: FCA US LLC, Auburn Hills, MI (US)

( * ) Notice: Subject to any disclaimer, the term of this patent is extended or adjusted under 35 U.S.C. 154(b) by 191 days.

(21) Appl. No.: 18/498,503

(22) Filed: Oct. 31, 2023

(65) Prior Publication Data
US 2025/0136179 A1    May 1, 2025

(51) Int. Cl.
| | | |
|---|---|---|
| *B62D 11/12* | (2006.01) | |
| *B60K 17/16* | (2006.01) | |
| *F16H 37/08* | (2006.01) | |
| *F16H 48/08* | (2006.01) | |
| *F16H 48/24* | (2006.01) | |

(52) U.S. Cl.
CPC ............ *B62D 11/12* (2013.01); *B60K 17/165* (2013.01); *F16H 37/082* (2013.01); *F16H 48/08* (2013.01); *F16H 48/24* (2013.01)

(58) Field of Classification Search
CPC ......... B62D 11/06; B62D 11/08; B62D 11/12; B62D 11/10; B60K 17/16; B60K 17/165; F16H 48/06; F16H 48/08; F16H 48/20; F16H 48/24; F16H 37/082
See application file for complete search history.

(56) References Cited

U.S. PATENT DOCUMENTS

| | | |
|---|---|---|
| 6,953,408 B2 | 10/2005 | Thompson |
| 7,294,082 B2 | 11/2007 | Lim et al. |
| 8,844,665 B2 | 9/2014 | Wenger et al. |
| 2007/0068710 A1 | 3/2007 | Witzenberger et al. |

FOREIGN PATENT DOCUMENTS

KR    20100047522 A  *  5/2010  ............. B60K 17/16

* cited by examiner

*Primary Examiner* — Timothy Hannon
(74) *Attorney, Agent, or Firm* — Jeremy J. Klobucar

(57) ABSTRACT

A drivetrain assembly for a vehicle having a propulsion system configured to drive first and second half shafts is provided. In one example, the drivetrain assembly includes a gearbox assembly configured to couple to the propulsion system, a planetary gear set selectively coupled to an output of the gearbox assembly, and a differential having a differential case, the differential configured to operably couple to the first and second half shafts. The drivetrain assembly operates in a tank steer mode by selectively grounding the differential case and connecting the output of the gearbox assembly to the first half shaft via the planetary gear set, such that the propulsion system rotates the first half shaft in the first direction and, via the differential, rotates the second half shaft in the opposite second direction.

19 Claims, 3 Drawing Sheets

TANK STEER SYSTEM FOR VEHICLE

FIELD

The present application relates generally to vehicles and, more particularly, to systems and methods for performing a tank steer operation in a vehicle.

BACKGROUND

A vehicle is typically limited by the turning circle of the steering system while the vehicle is rolling. In some off-road maneuvers, it is desirable for the vehicle to have a tighter turning radius than what is available on a stock vehicle, for example, if an obstacle prevents the vehicle from moving in a forward direction. In order to provide tighter turning, some electric vehicles can achieve a "tank steer" in order to help the vehicle make sharper turns by driving each wheel with an independent motor. However, such systems are expensive as they require four electric machines, four power inverters, and associated high voltage cables and components. Accordingly, while such systems so work well for their intended purpose, there remains a desire for improvement in the relevant art.

SUMMARY

In accordance with one example aspect of the invention, a drivetrain assembly for a vehicle having a propulsion system configured to drive first and second half shafts is provided. In one example, the drivetrain assembly includes a gearbox assembly configured to couple to the propulsion system, a planetary gear set selectively coupled to an output of the gearbox assembly, and a differential having a differential case, the differential configured to operably couple to the first and second half shafts. The drivetrain assembly is selectively operable in a tank steer mode that rotates one or more wheels on a first side of the vehicle in a first direction, and rotates one or more wheels on an opposite second side of the vehicle in a second direction opposite the first direction to thereby rotate the vehicle. The drivetrain assembly operates in the tank steer mode by selectively grounding the differential case and connecting the output of the gearbox assembly to the first half shaft via the planetary gear set, such that the propulsion system rotates the first half shaft in the first direction and, via the differential, rotates the second half shaft in the opposite second direction.

In addition to the foregoing, the described vehicle may include one or more of the following features: a pawl configured to ground the differential case in the tank steer mode; wherein the pawl is hinged to a ground and is spring-loaded to engage the differential case; wherein the ground is an axle case; a first selectable connector configured to selectively rotationally couple the gearbox assembly output to a sun gear of the planetary gear set or a planetary carrier of the planetary gear set; a second selectable connector configured to selectively rotationally couple the planetary carrier to the first half shaft or the differential case; wherein the second selectable connector disengages the pawl from the differential case when the second selectable connector rotationally couples the planetary carrier and the differential case; and wherein the first and second selectable connectors are dog clutches; wherein a ring gear of the planetary gear set is grounded.

In addition to the foregoing, the described vehicle may include one or more of the following features: a first selectable connector configured to selectively rotationally couple the gearbox assembly output to a sun gear of the planetary gear set or a planetary carrier of the planetary gear set, and a second selectable connector configured to selectively rotationally couple the planetary carrier to the first half shaft or the differential case; and wherein in the tank steer mode, the first selectable connector is coupled between the gearbox assembly output and the sun gear, and the second selectable connector is coupled between the planetary carrier and the first half shaft, wherein in a high gear drive mode, the first selectable connector is coupled between the gearbox assembly output and the planetary carrier, and the second selectable connector is coupled between the planetary carrier and the differential case such that the first and second half shafts rotate in the same direction, and wherein in a low gear drive mode, the first selectable connector is coupled between the gearbox assembly output and the sun gear, and the second selectable connector is coupled between the planetary carrier and the differential case such that the first and second half shafts rotate in the same direction.

In accordance with another example aspect of the invention, a vehicle configured to perform a tank steer operation is provided. In one example, the vehicle includes a propulsion system, a differential having a differential case, first and second half shafts operably coupled to the differential, a gearbox assembly coupled to the propulsion system, and a planetary gear set coupled to an output of the gearbox assembly. The vehicle is selectively operable in a tank steer mode that rotates one or more wheels on a first side of the vehicle in a first direction, and rotates one or more wheels on an opposite second side of the vehicle in a second direction opposite the first direction to thereby rotate the vehicle. The vehicle operates in the tank steer mode by selectively grounding the differential case and connecting the output of the gearbox assembly to the first half shaft via the planetary gear set, such that the propulsion system rotates the first half shaft in the first direction and, via the differential, rotates the second half shaft in the opposite second direction.

In addition to the foregoing, the described vehicle may include one or more of the following features: a pawl configured to ground the differential case in the tank steer mode; wherein the pawl is hinged to a ground and is spring-loaded to engage the differential case; wherein the ground is an axle case; a first selectable connector configured to selectively rotationally couple the gearbox assembly output to a sun gear of the planetary gear set or a planetary carrier of the planetary gear set, and a second selectable connector configured to selectively rotationally couple the planetary carrier to the first half shaft or the differential case; wherein the second selectable connector disengages the pawl from the differential case when the second selectable connector rotationally couples the planetary carrier and the differential case.

In addition to the foregoing, the described vehicle may include one or more of the following features: wherein the first and second selectable connectors are dog clutches; wherein a ring gear of the planetary gear set is grounded; and wherein in the tank steer mode, the first selectable connector is coupled between the gearbox assembly output and the sun gear, and the second selectable connector is coupled between the planetary carrier and the first half shaft, wherein in a high gear drive mode, the first selectable connector is coupled between the gearbox assembly output and the planetary carrier, and the second selectable connector is coupled between the planetary carrier and the differential case such that the first and second half shafts rotate in the same direction, and wherein in a low gear drive mode, the first selectable connector is coupled between the gearbox assembly output and the sun gear, and the second selectable connector is coupled between the planetary carrier and the differential case such that the first and second half shafts rotate in the same direction.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

According to the principles of the present application, systems and methods are described for performing a vehicle tank steer operation. In the example embodiments, a tank steer system is configured to enable the vehicle to rotate the wheels on one axle in opposite directions at zero vehicle speed, thereby enabling the vehicle to make very tight turns. While some level of functionality may be achieved by having tank steer on a single axle, higher functionality may be achieved by having the tank steer system installed on two or more axles. Thus, the system is configured to turn the wheels on one side of the vehicle in one direction (e.g., forward), while the wheels on the other side of the vehicle turn in the opposite direction (e.g., rearward), thereby rotating the vehicle around a center point.

In the example embodiments, the tank steer system includes a two-speed (high/low) reduction gear box driven by a propulsion unit (e.g., electric motor), a set of selectable splines/dog clutches, and a low ratio unit operably associated with a differential. The tank steer system provides a tank steer mode as well as a high gear drive mode, and a low gear drive mode.

Figure 1:
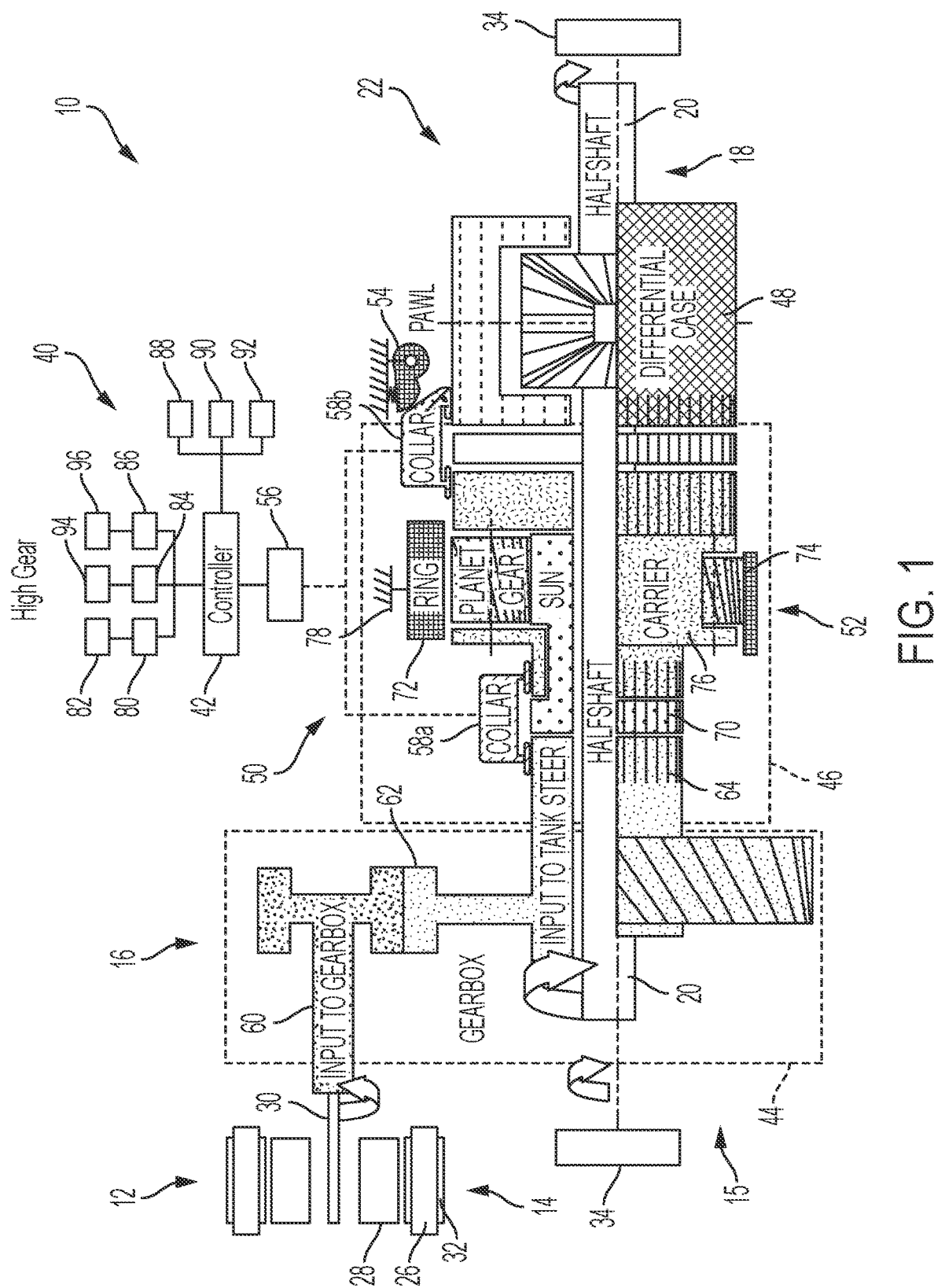
FIG. 1 is a schematic illustration of an example vehicle powertrain operating in a first mode, in accordance with the principles of the present application.

With initial reference to FIG. 1, a vehicle 10 in accordance with the principles of the present disclosure is illustrated. In the example embodiment, vehicle 10 includes a propulsion system 12 that generally includes one or more motors 14 (e.g., electric traction motors) to provide torque to a drivetrain assembly 15 that includes a reduction gearbox assembly 16. The electric motor(s) 14 are selectively connectable to a high voltage battery system (not shown) for powering the electric motor(s) 14, and the gearbox assembly 16 is configured to transfer the generated drive torque to a driveline 18, including a first or left axle shaft 20, a differential 22, and a second or right axle shaft 24. In the example embodiment, each electric motor 14 generally includes a stator 26, a rotor 28, and a rotor shaft 30. The stator 26 is fixed (e.g., to a housing 32) and the rotor 28 is configured to rotate relative to the stator 26 to drive the rotor shaft 30 and thus the vehicle axles 20, 24 (e.g., half shafts) and wheels 34. In the example embodiment, vehicle 10 includes a single drivetrain assembly 15 for each pair of axles 20, 24 (front and rear), though in some configurations, vehicle 10 may only include one drivetrain assembly in total.

In the example embodiment, vehicle 10 further includes a tank steer system 40 having a controller 42 configured to enable vehicle 10 to perform one or more tank steer movements by driving one or more wheels 34 on the left side of the vehicle 10 in a direction opposite one or more wheels 34 on the right side of the vehicle 10. In the example embodiment, tank steer system 40 generally includes electric motor 14, gearbox assembly 16, a selectable connector assembly 50, a planetary gear set 52, and the differential 22. In the illustrated example, the gearbox assembly 16 is housed within a housing 44, the selectable connector assembly 50 and planetary gear set 52 are housed within a housing 46, and the differential 22 is housed within a housing 48 (e.g., differential case). In one example, the housings 44-48 are connected to each other to form the single drivetrain assembly 15, which can subsequently be coupled to the vehicle 10.

As described herein in more detail, the selectable connector assembly 50 includes a pawl 54 as well as an actuator 56 to selectively translate/operate a set of selectable connectors 58a-b. In the illustrated example, the selectable connectors 58a-b are dog clutches configured to selectively connect two components to enable the various gears/drive modes such as (i) a high gear drive mode, (ii) a low gear drive mode, and (iii) a low gear tank steer mode. However, it will be appreciated that connectors 58a-b may be any suitable connector that enables vehicle 10 to function as described herein. One tank steer system 40 may be utilized for each pair of axles 20, 24.

Figure 2:
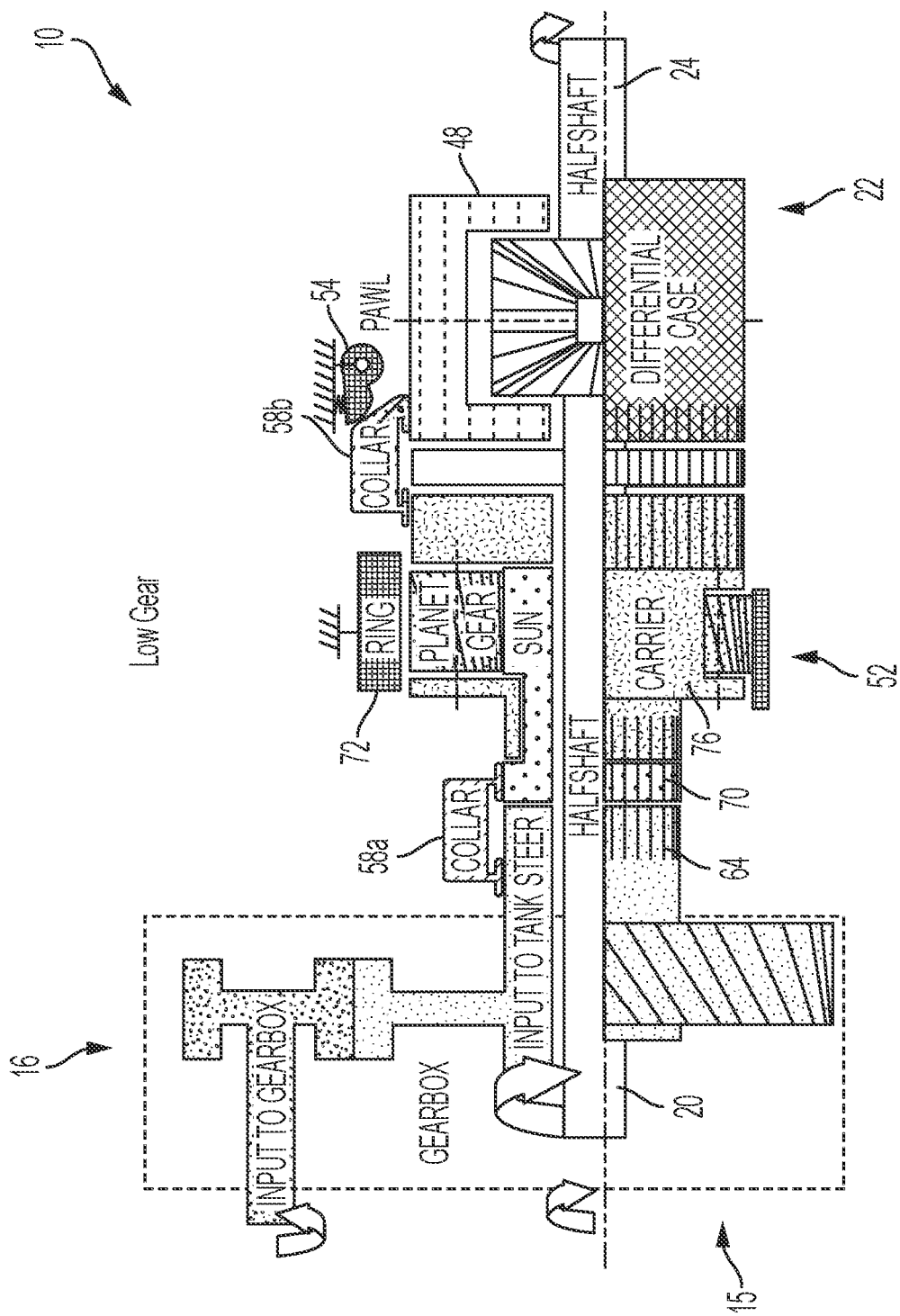
FIG. 2 is a schematic illustration of the vehicle powertrain of FIG. 1 operating in a second mode, in accordance with the principles of the present application.
Figure 3:
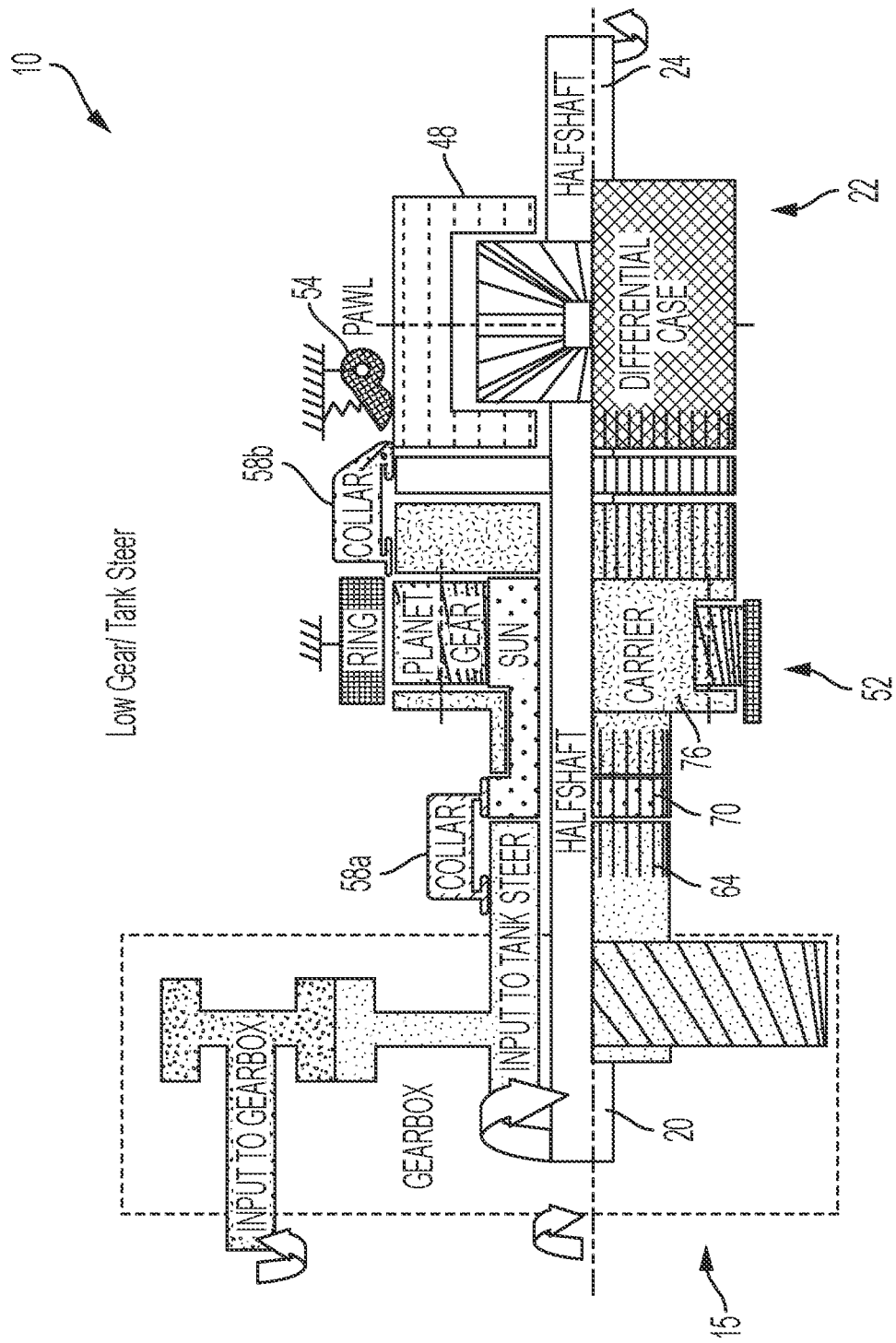
FIG. 3 is a schematic illustration of the vehicle powertrain of FIG. 1 operating in a third mode that provides a tank steer operation, in accordance with the principles of the present application.

With reference now to FIGS. 1-3, the drivetrain assembly 15 of vehicle 10 will be described in more detail. As shown, the drivetrain assembly 15 generally includes the reduction gearbox assembly 16, the planetary gear set 52, and the differential 22. The reduction gearbox assembly 16 generally includes an input shaft 60 (e.g., rotor shaft 30), an input gear 62, and an output gear 64. The electric motor 14 is rotatably connected to the input shaft 60, which is in meshing engagement with the input gear 62. Output gear 64 is coupled for rotation with the input gear 62.

In the example embodiment, the planetary gear set 52 generally includes a sun gear 70, a ring gear 72, planet gears 74, and a planetary carrier 76. The output gear 64 is selectively coupled to the sun gear 70 or the planetary carrier 76 via the first selectable connector 58a. The ring gear 72 is rigidly connected to ground 78 (e.g., an axle case), and the planetary carrier 76 is selectively coupled to the first axle shaft 20 or the differential case 48 via the second selectable connector 58b. When the output gear 64 is connected to the sun gear 70, the planetary gear set 52 achieves a ratio reduction by reacting off the ground 78 via ring gear 72 and provides a torque multiplied output.

With continued reference to FIGS. 1-3, the operational modes provided by the tank steer system 40 and drivetrain assembly 15 will be described in more detail. FIG. 1 illustrates the drivetrain assembly 15 operating in the high gear drive mode. FIG. 2 illustrates the drivetrain assembly 15 operating in the low gear drive mode. FIG. 3 illustrates the drivetrain assembly 15 operating in the low gear tank steer mode.

In the high gear drive mode (FIG. 1), the gearbox output gear 64 is coupled for rotation with the planetary carrier 76 via the first selectable connector 58a, and the planetary carrier 76 is coupled for rotation with the differential case 48 via the second selectable connector 58b. In operation, torque from electric motor 14 is transferred through reduction gearbox assembly 16 to the planetary carrier 76. The planetary gear set 52 rotates freely, and torque is output through the planetary carrier 76 and the second selectable connector 58b to the differential case 48. As shown, the second selectable connector 58b is positioned to contact and move pawl 54 out of engagement with the differential case 48. The torque is then transferred to the differential 22, which operates normally to provide the torque to the first and second axles 20, 24 for conventional axle rotation in the same direction.

In the low gear drive mode (FIG. 2), the gearbox output gear 64 is coupled for rotation with the sun gear 70 via the first selectable connector 58a, and the planetary carrier 76 is coupled for rotation with the differential case 48 via the second selectable connector 58b. In operation, torque from electric motor 14 is transferred through reduction gearbox assembly 16 to the sun gear 70 and through the planetary gear set 52. Because the ring gear 72 is grounded, speed is reduced and torque is multiplied for output through the planetary carrier 76 and the second selectable connector 58b to the differential case 48. As shown, the second selectable connector 58b is positioned to contact and move pawl 54 out of engagement with the differential case 48. The low speed, high torque is then transferred to the differential 22, which operates normally to provide the low speed, high torque to the first and second axles 20, 24 (low ratio axle) for rotation in the same direction.

In the low gear tank steer mode (FIG. 3), the gearbox output gear 64 is coupled for rotation with the sun gear 70 via the first selectable connector 58a, and the planetary carrier 76 is coupled for rotation with the first axle shaft 20 via the second selectable connector 58b. In operation, torque from electric motor 14 is transferred through reduction gearbox assembly 16 to the sun gear 70 and through the planetary gear set 52. Because the ring gear 72 is grounded, speed is reduced and torque is multiplied for output through the planetary carrier 76 and the second selectable connector 58b to the first axle shaft 20. Moving the second selectable connector 58b to the position shown releases the pawl 54, which is rotatably coupled to the ground 78 (e.g., to the axle case). The released pawl 54 is biased (e.g., spring-loaded) into engagement with the differential case 48 for grounding thereof. As such, torque flows through the planetary gear set 52 to the first axle shaft 20. The immobilized differential case 48 subsequently acts as a reverser such that the second axle shaft 24 rotates in the opposite direction of the first axle shaft 20, thereby providing the tank steer functionality. Provided the input direction can be reversed, as in the case of the electric motor 14, the direction of rotation of the axle shafts 20, 24 can be easily switched, thereby achieving tank steer in either direction.

With continued reference to FIG. 1, controller 42 is in signal communication with a plurality of vehicle systems/components including: an instrument panel 80 having a tank steer mode switch 82, a steering wheel 84, a display 86, a brake pedal 88, and an accelerator pedal 90. Controller 42 is also in signal communication with an instrument panel cluster 92, the selectable connector assembly actuator 56, and electric motor 14.

In the example embodiment, tank steer mode switch 82 is configured to switch vehicle 10 between the normal high or low gear mode and the tank steer mode. In one example implementation, the tank steer mode switch 82 must first be activated before tank steer system 40 can be activated. The steering wheel 84 is configured to control the direction of the tank steer operation by orienting the steering wheel 84 in the direction of the desired tank steer turn before initiation thereof. In some examples, steering wheel 84 additionally includes one or more input switches 94 (e.g., buttons, paddle shifters) utilized to activate and/or control the tank steer operation.

In the example embodiment, the tank steer operation can be initiated and performed automatically or manually. For automatic operation, display 86 includes a user interface or touch screen 96 configured to display one or more soft buttons (not shown) for a user to automatically activate a tank steer mode (as opposed to manual operation). The soft button(s) enable the user to direct the controller 42 to automatically tank steer the vehicle 10 to a desired direction or heading (e.g., rotate 45°), and subsequently automatically enter the tank steer mode and perform the tank steer operation.

If manual control of the tank steer is desired, the driver can utilize the brake pedal 88 and accelerator pedal 90 as inputs to control the tank steer. For example, when the accelerator pedal 90 is pressed, the vehicle 10 is tank steered (e.g., rotated) in the desired direction (left or right), for example, based on a position of steering wheel 84. Pressing the brake pedal 88 subsequently brakes the wheels 34 and prevents further tank steer rotation. Additionally, the instrument panel cluster 92 includes a display configured to display a status and/or diagnostic message from the tank steer system 40. Control of the tank steer system may be the same or similar to that described in commonly owned, co-pending U.S. patent application Ser. No. 18/158,143, filed Jan. 23, 2023, the entire contents of which are incorporated herein by reference thereto.

Described herein are systems and methods for performing a vehicle tank steer operation. The system includes a single drivetrain assembly on each axle with selectively actuated dog clutches. During tank steer operation, a first dog clutch rotationally couples a reduction gearbox assembly to the sun gear of a planetary gear set having a grounded ring gear. A second dog clutch rotationally couples the planetary carrier to a first half shaft, and a pawl grounds a differential case. While the first half shaft rotates in a first direction, the grounded differential case reverses rotation of a second half shaft to provide the tank steer movement of the vehicle.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A drivetrain assembly for a vehicle having a propulsion system configured to drive first and second half shafts, the drivetrain assembly comprising:
   a gearbox assembly configured to couple to the propulsion system;
   a planetary gear set selectively coupled to an output of the gearbox assembly; and
   a differential having a differential case, the differential configured to operably couple to the first and second half shafts;
   wherein the drivetrain assembly is selectively operable in a tank steer mode that rotates one or more wheels on a first side of the vehicle in a first direction, and rotates one or more wheels on an opposite second side of the vehicle in a second direction opposite the first direction to thereby rotate the vehicle, and
   wherein the drivetrain assembly operates in the tank steer mode by selectively grounding the differential case and connecting the output of the gearbox assembly to the first half shaft via the planetary gear set, such that the propulsion system rotates the first half shaft in the first direction and, via the differential, rotates the second half shaft in the opposite second direction.

2. The drivetrain assembly of claim 1, further comprising a pawl configured to ground the differential case in the tank steer mode.

3. The drivetrain assembly of claim 2, wherein the pawl is hinged to a ground and is spring-loaded to engage the differential case.

4. The drivetrain assembly of claim 3, wherein the ground is an axle case.

5. The drivetrain assembly of claim 3, further comprising:
   a first selectable connector configured to selectively rotationally couple the gearbox assembly output to a sun gear of the planetary gear set or a planetary carrier of the planetary gear set; and
   a second selectable connector configured to selectively rotationally couple the planetary carrier to the first half shaft or the differential case.

6. The drivetrain assembly of claim 5, wherein the second selectable connector disengages the pawl from the differential case when the second selectable connector rotationally couples the planetary carrier and the differential case.

7. The drivetrain assembly of claim 5, wherein the first and second selectable connectors are dog clutches.

8. The drivetrain assembly of claim 1, wherein a ring gear of the planetary gear set is grounded.

9. The drivetrain assembly of claim 1, further comprising:
   a first selectable connector configured to selectively rotationally couple the gearbox assembly output to a sun gear of the planetary gear set or a planetary carrier of the planetary gear set; and
   a second selectable connector configured to selectively rotationally couple the planetary carrier to the first half shaft or the differential case.

10. The drivetrain assembly of claim 9, wherein in the tank steer mode, the first selectable connector is coupled between the gearbox assembly output and the sun gear, and the second selectable connector is coupled between the planetary carrier and the first half shaft,
   wherein in a high gear drive mode, the first selectable connector is coupled between the gearbox assembly output and the planetary carrier, and the second selectable connector is coupled between the planetary carrier and the differential case such that the first and second half shafts rotate in the same direction, and
   wherein in a low gear drive mode, the first selectable connector is coupled between the gearbox assembly output and the sun gear, and the second selectable connector is coupled between the planetary carrier and the differential case such that the first and second half shafts rotate in the same direction.

11. A vehicle configured to perform a tank steer operation, the vehicle comprising:
   a propulsion system;
   a differential having a differential case;
   first and second half shafts operably coupled to the differential;
   a gearbox assembly coupled to the propulsion system; and
   a planetary gear set coupled to an output of the gearbox assembly;
   wherein the vehicle is selectively operable in a tank steer mode that rotates one or more wheels on a first side of the vehicle in a first direction, and rotates one or more wheels on an opposite second side of the vehicle in a second direction opposite the first direction to thereby rotate the vehicle, and
   wherein the vehicle operates in the tank steer mode by selectively grounding the differential case and connecting the output of the gearbox assembly to the first half shaft via the planetary gear set, such that the propulsion system rotates the first half shaft in the first direction and, via the differential, rotates the second half shaft in the opposite second direction.

12. The vehicle of claim 11, further comprising a pawl configured to ground the differential case in the tank steer mode.

13. The vehicle of claim 12, wherein the pawl is hinged to a ground and is spring-loaded to engage the differential case.

14. The vehicle of claim 13, wherein the ground is an axle case.

15. The vehicle of claim 13, further comprising:
   a first selectable connector configured to selectively rotationally couple the gearbox assembly output to a sun gear of the planetary gear set or a planetary carrier of the planetary gear set; and
   a second selectable connector configured to selectively rotationally couple the planetary carrier to the first half shaft or the differential case.

16. The vehicle of claim 15, wherein the second selectable connector disengages the pawl from the differential case when the second selectable connector rotationally couples the planetary carrier and the differential case.

17. The vehicle of claim 15, wherein the first and second selectable connectors are dog clutches.

18. The vehicle of claim 15, wherein in the tank steer mode, the first selectable connector is coupled between the gearbox assembly output and the sun gear, and the second selectable connector is coupled between the planetary carrier and the first half shaft,
   wherein in a high gear drive mode, the first selectable connector is coupled between the gearbox assembly output and the planetary carrier, and the second selectable connector is coupled between the planetary carrier and the differential case such that the first and second half shafts rotate in the same direction, and wherein in a low gear drive mode, the first selectable connector is coupled between the gearbox assembly output and the sun gear, and the second selectable connector is coupled between the planetary carrier and the differential case such that the first and second half shafts rotate in the same direction.

19. The vehicle of claim 11, wherein a ring gear of the planetary gear set is grounded.

* * * * *